United States Patent
Booth et al.

[11] Patent Number: 5,973,833
[45] Date of Patent: Oct. 26, 1999

[54] HIGH EFFICIENCY POLARIZING CONVERTER

[75] Inventors: David K. Booth, Tigard; Arlie R. Conner, Tualatin, both of Oreg.

[73] Assignee: Lightware, Inc., Beaverton, Oreg.

[21] Appl. No.: 08/920,359

[22] Filed: Aug. 29, 1997

[51] Int. Cl.[6] .................................................. G02B 5/30
[52] U.S. Cl. ........................ 359/487; 359/485; 349/62; 349/96
[58] Field of Search .................... 359/483, 485, 359/487, 495, 496, 500; 353/20; 362/19; 349/5, 8, 9, 96, 62

[56] References Cited

U.S. PATENT DOCUMENTS

| | | | |
|---|---|---|---|
| Re. 26,506 | 12/1968 | Rogers | 359/497 |
| 3,463,571 | 8/1969 | Boehm et al. | 359/495 |
| 4,063,800 | 12/1977 | Iizuka et al. | 359/690 |
| 4,118,108 | 10/1978 | Muszumanski | 359/690 |
| 4,437,099 | 3/1984 | Kandler | 343/756 |
| 4,637,690 | 1/1987 | Miyamae et al. | 359/683 |
| 4,749,259 | 6/1988 | Ledebuhr | 349/8 |
| 4,936,656 | 6/1990 | Yamashita et al. | 349/8 |
| 5,122,895 | 6/1992 | Takanashi et al. | 359/247 |
| 5,124,841 | 6/1992 | Oishi | 359/495 |
| 5,153,752 | 10/1992 | Kurematsu et al. | 349/9 |
| 5,164,854 | 11/1992 | Takanashi et al. | 359/256 |
| 5,200,843 | 4/1993 | Karasawa et al. | 349/9 |
| 5,243,669 | 9/1993 | Alferness et al. | 385/11 |
| 5,272,496 | 12/1993 | Nicolas et al. | 353/34 |
| 5,276,410 | 1/1994 | Fukuzawa et al. | 333/21 |
| 5,299,036 | 3/1994 | Nicolas et al. | 349/9 |
| 5,363,222 | 11/1994 | Ledebuhr | 349/8 |
| 5,493,624 | 2/1996 | Thompson | 385/11 |
| 5,515,202 | 5/1996 | Wright | 359/634 |
| 5,530,496 | 6/1996 | Mizukawa et al. | 353/63 |
| 5,539,845 | 7/1996 | van der Tol | 385/11 |
| 5,541,673 | 7/1996 | Shioya et al. | 348/752 |
| 5,552,922 | 9/1996 | Magarill | 359/224 |
| 5,566,007 | 10/1996 | Ikeda et al. | 349/5 |
| 5,566,367 | 10/1996 | Mitsutake et al. | 359/497 |
| 5,570,209 | 10/1996 | Usui et al. | 349/5 |
| 5,576,854 | 11/1996 | Schmidt et al. | 349/5 |
| 5,590,942 | 1/1997 | Kimura et al. | 353/34 |
| 5,650,873 | 7/1997 | Gal et al. | 359/487 |
| 5,751,480 | 5/1998 | Kitagishi | 359/487 |
| 5,757,547 | 5/1998 | Rodman et al. | 359/487 |
| 5,764,319 | 6/1998 | Nishihara | 349/8 |

FOREIGN PATENT DOCUMENTS

| | | | |
|---|---|---|---|
| 1041633 | 10/1953 | France | 359/496 |
| 4-58214 | 2/1992 | Japan | 359/495 |
| 4-139416 | 5/1992 | Japan | 359/495 |

*Primary Examiner*—Cassandra Spyrou
*Assistant Examiner*—John Juba, Jr.
*Attorney, Agent, or Firm*—Ipsolon LLP

[57] ABSTRACT

A high efficiency polarizing converter receives generally collimated light of arbitrary polarization and converts it to light of a selected polarization with minimal loss or absorption of light. In one embodiment, the polarizing converter has a generally planar configuration that is suitable for flat panel displays, LCD projectors, and other display applications.

22 Claims, 4 Drawing Sheets

HIGH EFFICIENCY POLARIZING CONVERTER

FIELD OF THE INVENTION

The present invention relates to polarizing converters for converting the polarization of light and, in particular, to a polarizing converter of high efficiency having in one embodiment a generally planar configuration.

BACKGROUND AND SUMMARY OF THE INVENTION

Polarizing converters are well known. Commonly available film polarizers are generally effective for polarizing light but suffer from several disadvantages. The disadvantages include low efficiency (i.e., approximately 43% transmission of unpolarized incident light) and poor resistance to high temperatures (caused in part by the absorption of one-half of the unpolarized incident light). Moreover, high temperatures frequently arise in some display applications such as liquid crystal display (LCD) image projectors in which high intensity light sources are used to project images onto display screens. As a design dilemma, the low light transmission of common film polarizers require ever brighter, and hence hotter, light sources that increase the likelihood of causing heat damage to the polarizers.

Various polarizing converters of higher efficiency are also known, including those described in U.S. Pat. Nos. 5,493,624, 5,276,410, 5,539,845, 5,299,036, 5,272,496, 5,200,843, 5,164,854, 5,566,367, and 4,437,099. Many of these polarizing converters (commonly called polarization beam splitters) utilize combinations of discrete prisms and reflective surfaces arranged along relatively complex optical paths. While providing improved efficiency over common film polarizers, such polarizing converters suffer from the disadvantages of being structurally complex, bulky, and impractical to manufacture. These disadvantages are particularly troublesome in LCD projectors and flat panel display applications where structural complexity and bulk are antithetical to the design objectives of the display systems.

In accordance with the present invention, a high efficiency polarizing converter receives generally collimated light of arbitrary polarization and converts it to light of a selected polarization with minimal loss or absorption of the light. In one embodiment, the polarizing converter has a generally planar configuration that is suitable for flat panel displays, LCD projectors, and other display applications.

In its generally planar embodiment, the polarizing converter includes a planar beam splitter that has an array of light splitting prismatic structures and is analogous to a linear Fresnel lens. The planar beam splitter splits the incident light and directs it in two directions at equal but opposite deflection angles. A reflective polarizer (e.g., film) receives light propagating past the beam splitting prismatic structures. The reflective polarizer receives light of arbitrary polarization, transmits light components of a selected first polarization sense, and reflects light of an orthogonal second polarization sense.

Transmitted light of the first polarization sense passes through the reflective polarizer to a planar light combiner having an array of light combining prismatic structures that collimate and direct the light in an illumination direction that is substantially the same as the direction of the incident light. The light combiner is also analogous to a linear Fresnel lens. The light of the second polarization sense reflected by the reflective polarizer is directed back toward recesses between the prismatic structures of the beam splitter. A reflector arrangement has a planar array of frusto-prismatic reflector structures that are aligned with and extend into the recesses between adjacent prismatic structures of the beam splitter. The reflector structures reflect the light of the second polarization sense and direct it back toward the reflective polarizer. The reflection by the reflector structures changes the light from the second to the first polarization sense, so the light now passes through the reflective polarizer and into the combiner to be collimated and directed in the illumination direction.

This polarizing converter polarizes light with estimated efficiencies of up to 80 percent, representing an improvement of about 85 percent over the performance of conventional film polarizers. The generally planar configuration of the polarizing converter provides a compact, rugged, manufacturable structure that is compatible with various display applications including LCD projector displays. As a result, the polarization converter of this invention overcomes the losses or inefficiencies of conventional film polarizers while also overcoming the complexity and bulk of known high efficiency polarizing converters.

The foregoing and other features and advantages of preferred embodiments of the present invention will be more readily apparent from the following detailed description, which proceeds with reference to the accompanying drawings.

DETAILED DESCRIPTION OF PREFERRED EMBODIMENTS

Figure 1:
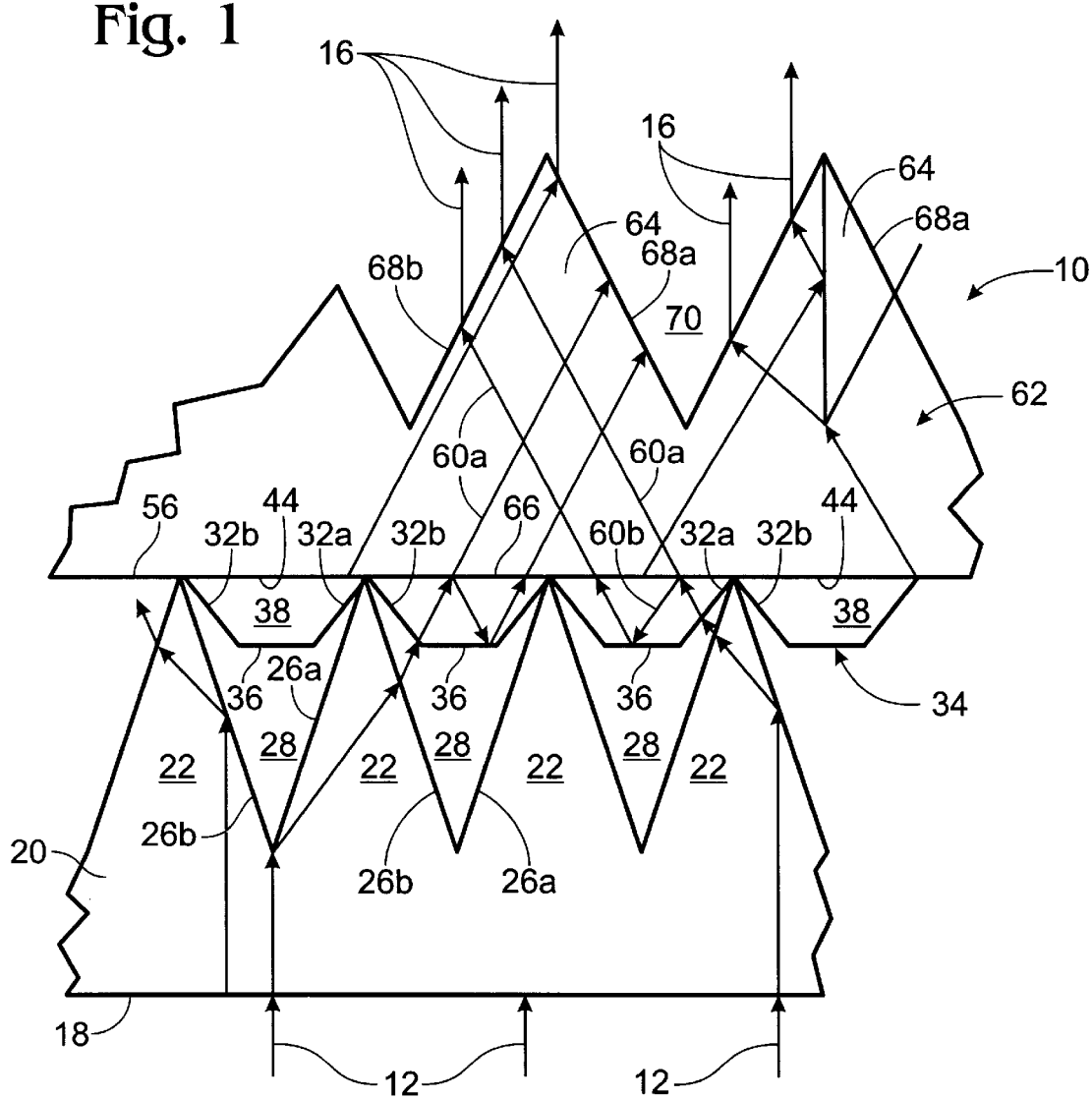
FIG. 1 is a fragmentary end view of a generally planar embodiment of a high efficiency polarizing converter of the present invention.
Figure 2:
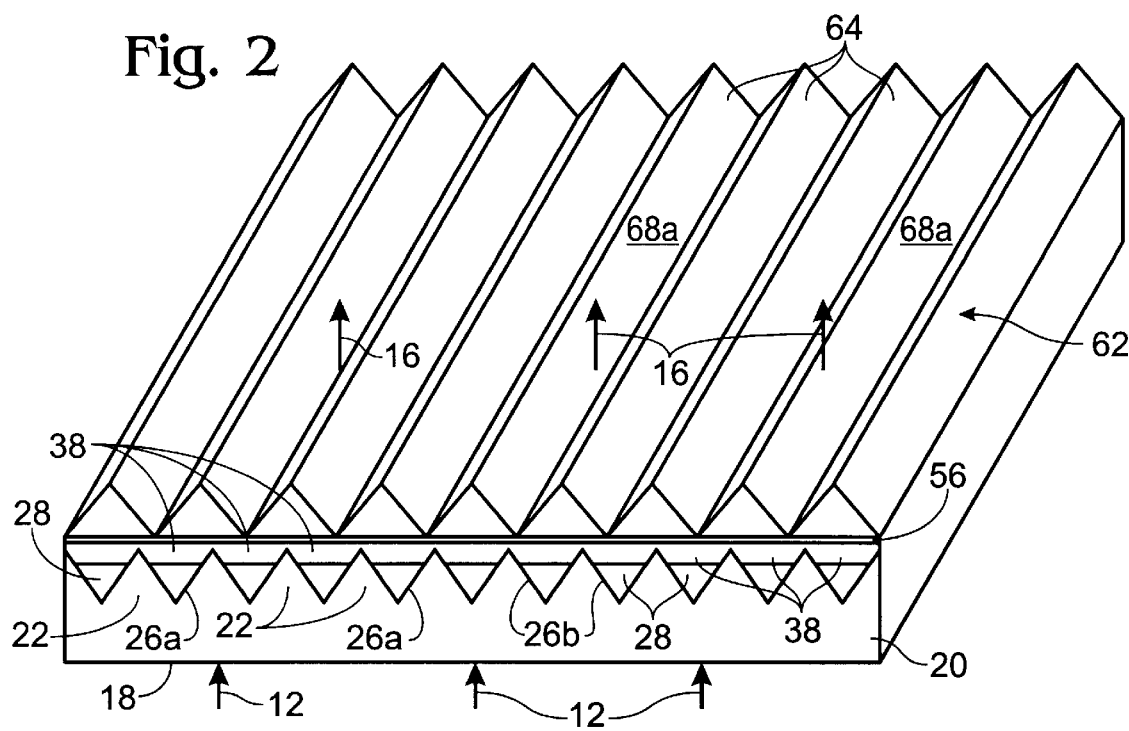
FIG. 2 is a diagrammatic illustration of the polarizing converter of FIG. 1.

FIGS. 1–3 show one embodiment of a high efficiency polarizing converter 10 of the present invention that receives generally collimated light 12 of arbitrary, typically random, polarization and converts it to light 16 of a selected polarization. Polarizing converter 10 has a generally planar configuration and converts the polarization of light 12 with minimal loss or absorption of light 12.

In this embodiment, polarizing converter 10 receives light 12 at a light input surface 18 of a planar beam splitter 20.

Planar beam splitter 20 includes an array of light splitting prismatic structures 22 that are positioned opposite and preferably integral with light input surface 18. Prismatic structures 22 are transparent, solid, and straight and include pairs of inclined intersecting faces 26a and 26b. Adjacent faces 26a and 26b of adjacent structures 22 are oppositely inclined and form grooves or recesses 28 therebetween. Beam splitter 20 splits the received light 12 and converges it by total internal reflection toward tips 30 of prismatic structures 22.

Light 12 entering surface 18 normally and striking one of faces 26a and 26b of a prismatic structure 22 is totally internally reflected once toward the other of faces 26b and 26a of the prismatic structure 22. The once-reflected light 12 is converged toward tip 30 where portions of faces 26a and 26b are opposite respective transparent sidewalls or faces 32a and 32b of a reflector arrangement 34. The light 12 passes through and is refracted at faces 26a and 26b and passes through faces 32a and 32b into reflector arrangement 34.

Reflector arrangement 34 includes a planar array of frusto-prismatic reflector structures 38 that support flat reflector surfaces 36 and are aligned with and extend into recesses 28 between adjacent prismatic structures 22. Reflector structures 38 are transparent, solid, and straight (linear). Adjacent faces 32a and 32b of adjacent reflector structures 38 are oppositely inclined between frustum bases 44 and reflector surfaces 36 and form between surfaces 36 grooves or recesses 46 that receive tips 30 of prismatic structures 22. Reflector arrangement 34 may further include an integral, flat common base (not shown) that extends across frustum bases 44.

Frustum bases 44 preferably form a contiguous surface across which a flat reflective polarizer 56 is positioned. With additional reference to FIG. 3B, reflective polarizer 56 receives light 12 passing through faces 32a and 32b of arbitrary (random) polarization, transmits light components of a selected first polarization sense and reflects light of an opposite (orthogonal) second polarization sense. Reflective polarizer 56 may be selected to transmit and reflect opposed circular polarizations of light or opposed linear polarizations of light and is available as Dual Brightness Enhancing Film (DBEF) from 3M Corporation of St. Paul, Minn. The following description is made with reference to reflective polarizer 56 transmitting and reflecting opposed circular polarizations of light.

Transmitted light 60a of the first polarization sense (e.g., right circular polarized) propagates through a planar light combiner 62 having an array of light combining prismatic structures 64 positioned opposite and integral with an intermediate light receiving surface 66. Prismatic structures 64 are transparent, solid, and straight (linear) and include pairs of inclined intersecting faces 68a and 68b. Adjacent faces 68a and 68b of adjacent structures 64 are oppositely inclined and form grooves or recesses 70 therebetween. Combiner 62 directs light 60a through faces 68a in a common, preferably collimated, illumination direction 72.

Light 60b of the second polarization sense (e.g., left circular polarized) reflected by reflective polarizer 56 is directed back toward reflector surfaces 36. Light 60b is reflected by the reflector surfaces 36, thereby changing from the second to the first polarization sense, and directed back toward reflective polarizer 56. Now being of the first polarization sense, light 60b passes through reflective polarizer 56 and into combiner 62 to be directed with light 60a in illumination direction.

Beam splitter 20 compresses light 12 toward the tips of prismatic structures 22 so that virtually all light 12 passes into faces 32a and 32b of reflector arrangement 34. Compressing it in this manner allows all of light 12 to be directed around reflector surfaces 36 and into reflective polarizer 56. In other words, compression of light 12 forms "dark" regions (with respect to incident light 12) where reflector surfaces 36 can be positioned to recover or "recycle" the polarized light reflected by reflective polarizer 56.

The faces of the prismatic structures in beam splitter 20 and combiner 62 have angular symmetry about their intersections. The angular symmetry of faces 26a and 26b allows frusto-prismatic reflector structures 38 to be positioned centrally between prismatic structures 22. Centrally positioned reflector surfaces 36 therefore recycle polarized light reflected by reflective polarizer 56 uniformly whether the light passed originally through face 32a or 32b. Similarly, the angular symmetry of faces 68a and 68b of combiner 62 provide a generally uniform distribution of the light formerly split and compressed by beam splitter 20. Light 12 is distributed by combiner 62 independently of whether light 12 passed initially through faces 26a/32a (right-side light) or faces 26b/32b (left side light).

The angular symmetry of faces 68a and 68b of combiner 62 avoids the "riser loss" characteristic of common Fresnel lenses in which the faces of the prismatic structures are angled asymmetrically so that most light passes through one face (the facet) while the other face is nearly parallel to the light propagation direction (the riser). Riser loss refers to the inability of light to pass from a facet in the same direction as light passes from an asymmetrical riser. Light hitting the riser is commonly reflected or transmitted in useless directions, so a common design choice is to minimize the angular extent of risers. In contrast, the symmetry of prismatic structures 64 in effect eliminates risers completely.

Polarizing converter 10 polarizes light with estimated efficiencies of up to 80 percent, representing an improvement of about 85 percent over the performance of conventional film polarizers. Moreover, the generally planar configuration of polarizing converter 10 provides a compact, rugged, manufacturable structure that is compatible with various display applications including LCD projector displays.

An aspect of the manufacturability of polarizing converter 10 is that at least beam splitter 20 and combiner 62 may be formed according to conventional process used in the manufacture of Fresnel lenses. These processes may include the machining of glass or plastic plates, but more commonly would include molding of optical plastic materials including acrylic, polycarbonate, moldable epoxies, silicones, and UV cure, thermal cure, or two-part plastics.

With reference to reflective polarizer 56 transmitting and reflecting opposed linear polarizations of light, polarizing converter 10 further includes a planar polarization rotator (e.g., a quarter-wave retarder, not shown) positioned parallel to and between reflective polarizer 56 and frustum bases 44. Randomly polarized light entering faces 32a and 32b passes through the quarter wave retarder with no net polarization change. Reflective polarizer 56 transmits light 60a of the first polarization sense (e.g., S linear polarized), which light 60a propagates through light combining prismatic structures 64 of planar light combiner 62. Light 60a passes through faces 68a in a common, preferably collimated, illumination direction 72.

Figure 4:
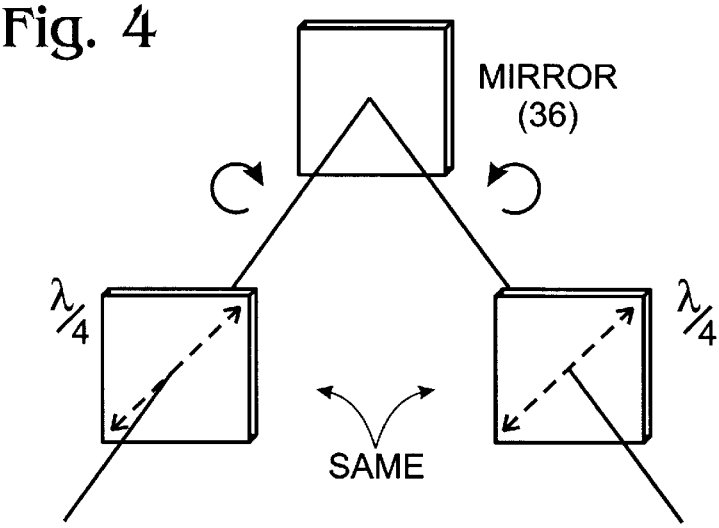
FIG. 4 is an illustration of time sequential polarizations of linearly polarized light reflected by a reflective polarizer included in the polarizing converter of FIG. 1.

Light 60b of the second polarization sense (e.g., P linear polarized) reflected by reflective polarizer 56 is directed back toward reflector surfaces 36 through the quarter wave retarder. The quarter wave retarder is oriented to circularly polarize the reflected light 60b in an initial circular polarization sense. Light 60b is then reflected by the reflector surfaces 36, thereby changing to an opposite circular polarization sense, and directed back through the quarter wave retarder toward reflective polarizer 56. Passing through the quarter wave retarder again converts the light from the opposite circular polarization sense to S linear polarized light. Now being of the first polarization sense, light 60b passes through reflective polarizer 56 and into combiner 62 to be directed with light 60a in illumination direction 72. FIG. 4 illustrates the time sequential polarizations of linearly polarized light reflected by reflective polarizer 56 and analyzed by the quarter wave retarder.

Figure 3A:
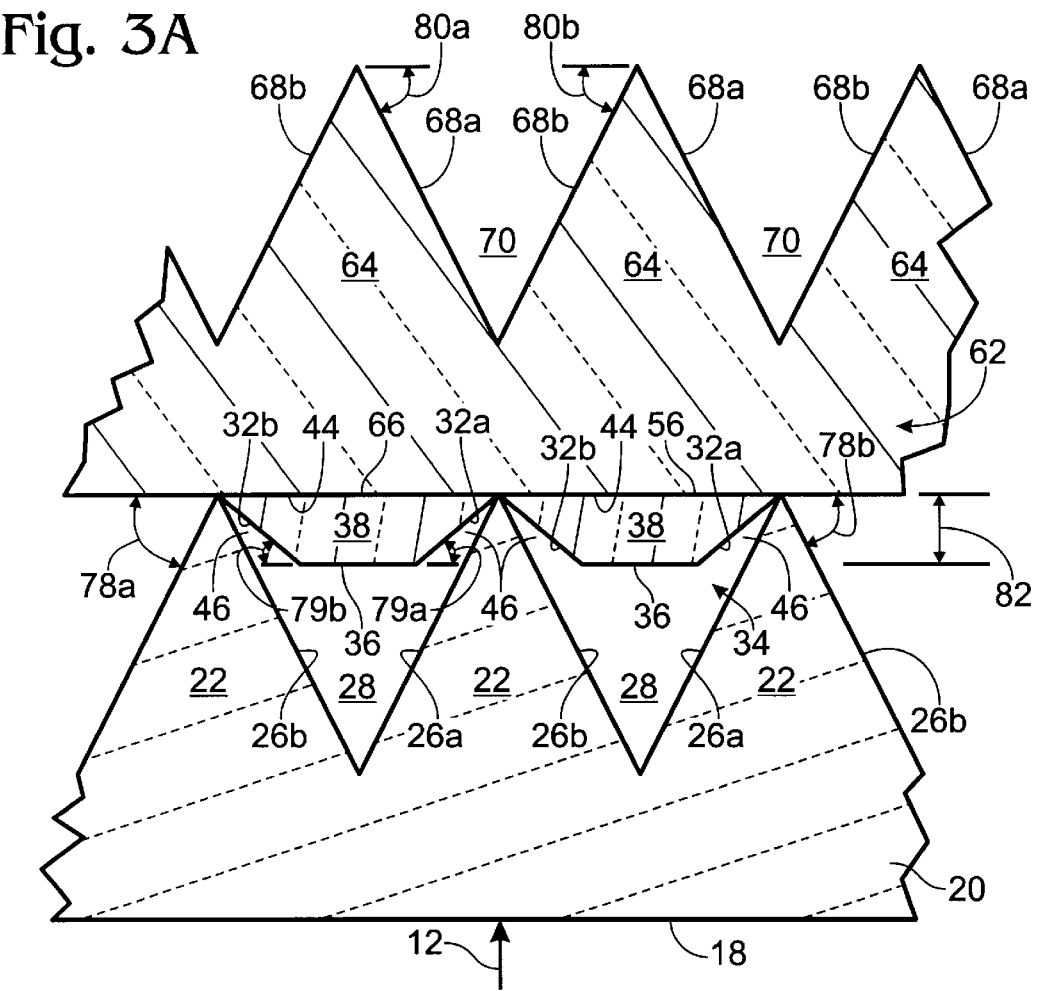
FIG. 3A is an enlarged fragmentary end view of the polarizing converter of FIG. 1 illustrating angular relationships of structural components.
Figure 3B:
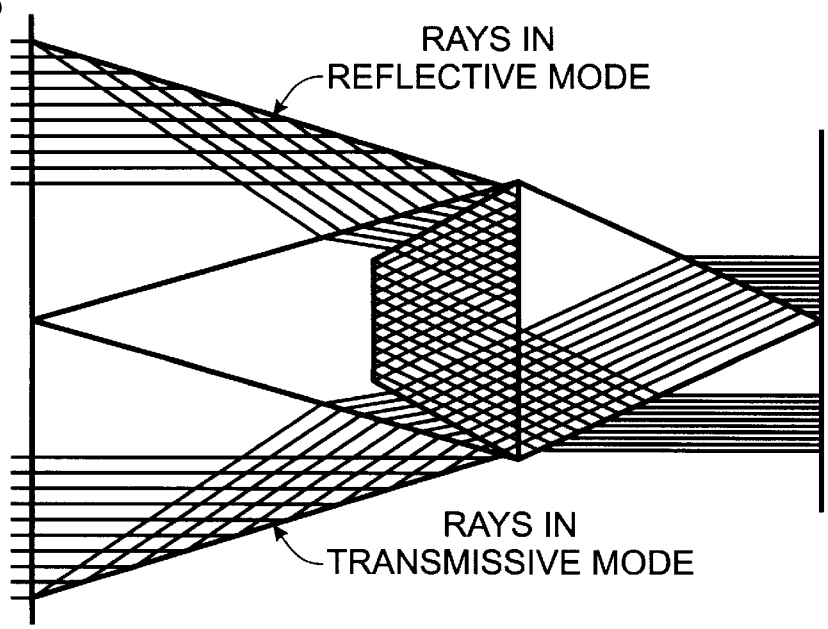
FIG. 3B is an illustration of reflective and transmissive optical paths of light striking a reflective polarizer included in the polarizing converter of FIG. 1.

The optical characteristics of beam splitter 20 and combiner 62 are set according to the indices of refraction of the materials from which they are formed and the angles between the adjacent faces of the prismatic structures, referred to as the facet angles. With reference to FIG. 3A, symmetric angles for the prismatic structure faces of combiner 62 may be determined from Snell's Law with respect to the index of refraction of the materials from which it is formed and the angles at which light passes to or from it. Snell's Law may be represented by the following equation:

$$n_1/n_2 = \sin \theta_1 / \sin \theta_2.$$

Utilizing a material such as acrylic, for example, having an index of refraction of 1.492, and design selections of normally collimated output light and input light propagating substantially parallel to them (e.g., within a few degrees), faces 68a or 68b are formed at respective angles 80a and 80b of 64°.

Beam splitter 20 is defined by the condition that light normally incident and striking a prismatic structure face 26a or 26b is totally internally reflected (TIR). Normally incident light is uniformly distributed over symmetrical faces 26a and 26b and then is compressed toward the tips of prismatic structures 22. With light passing into input surface 18 normally, that is at 0° from normal to input surface 18, and with beam splitter 20 formed of acrylic having an index of refraction of 1.49, faces 26a and 26b are formed at respective angles 78a and 78b of 72°. These angles compress or concentrate the TIR light toward the tips of prismatic structures 22. Light exiting from faces 26a/26b passes into a fluid medium (e.g., air) and, by Snell's Law, propagates at 11° to respective surfaces 32a/32b which are set at angles 79a/79b of 55° in reflector structures 38.

Combiner 62 may be formed of a material different from that of beam splitter 20. In this case, the angles at which the corresponding prismatic structure faces are formed will differ accordingly. Moreover, the pitch or spacing of prismatic structures 22 and 64 of respective beam splitter 20 and combiner 62 may also differ.

Polarizing reflector 56 may be, for example, a double brightness enhancing film (DBEF) such as that available from 3M Corporation and commonly used as a backlight reflector in LCD displays for laptop computers. Reflector arrangement 34 may be formed in a number of ways, but in contrast to the independence of the pitches of the prismatic structures on beam splitter 20 and combiner 62, reflector structures 38 have a pitch matched to that of prismatic structures 22 on beam splitter 20.

Reflector arrangement 34 may be formed in substantially the same manner as beam splitter 20 and combiner 62 and then molded or bonded in place with polarizing reflector 56 between them. In another embodiment, polarizing reflector 56 is bonded to surface 66 of combiner 62 and reflector arrangement 34 is formed directly thereon. In this embodiment, acrylic and epoxy are desirable materials from which to form reflector arrangement 34 because they are molded at relatively lower temperatures that are less likely to damage polarizing reflector 56. After reflector arrangement 34 is formed, a common optical reflective coating is applied to form reflector surfaces 36 so they reflect toward frustum bases 44.

A benefit in the latter method of assembly reflector arrangement 34 is that it can facilitate alignment or registration of reflector structures 38 with recesses 28 between prismatic structures 22. The alignment between reflector structures and recesses 28 is uniform such that each reflector surface 36 is centered within recess 28 extends into recess 28 a distance 82 sufficient that faces 32a/32b capture all light compressed by and passing from prismatic structures 22. If reflector arrangement 34 includes an integral, flat common base (not shown) that extends across frustum bases 44, the common base may have a thickness that is less than 10 percent, and preferably less than 5 percent, of the pitch (i.e., tip-to-tip distance) of prismatic structures 22. One manner of maintaining such uniformity is to apply a slight vacuum (e.g., ½ inch $H_2O$) in the regions between reflector structures 28 and prismatic structures 22.

One characteristic of polarizing converter 10 is that the prismatic structures can, in some embodiments, introduce color dispersion of the light. While color dispersion would be minimized in many applications, some applications could utilize color-dispersed light to illuminate particular (e.g., red, green, and blue) display elements. The symmetries of polarizing converter 10 of FIGS. 1–3 would intermix the color-disbursed light.

Figure 5:
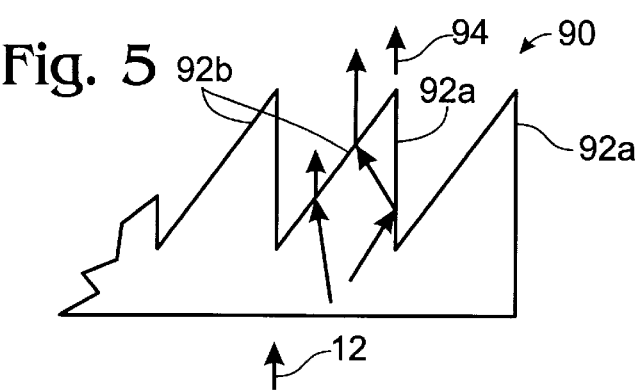
FIG. 5 is a fragmentary end view of an alternative embodiment of a generally planar combiner for use in the polarizing converter of FIG. 1.

FIG. 5 illustrates an alternative combiner 90 that can be substituted for combiner 62 in polarizing converter 10 to merge the corresponding color components of color-disbursed light. Combiner 90 includes faces 92b that are oriented substantially the same as faces 68b of combiner 62. Combiner 90 also includes, however, faces 92a that are substantially parallel to the normal direction of incident light 12. As a result, light internally striking faces 92b is directed in a collimated illumination direction 94, whereas light internally striking faces 92a is totally internally reflected toward faces 92b to be collimated.

Figure 6:
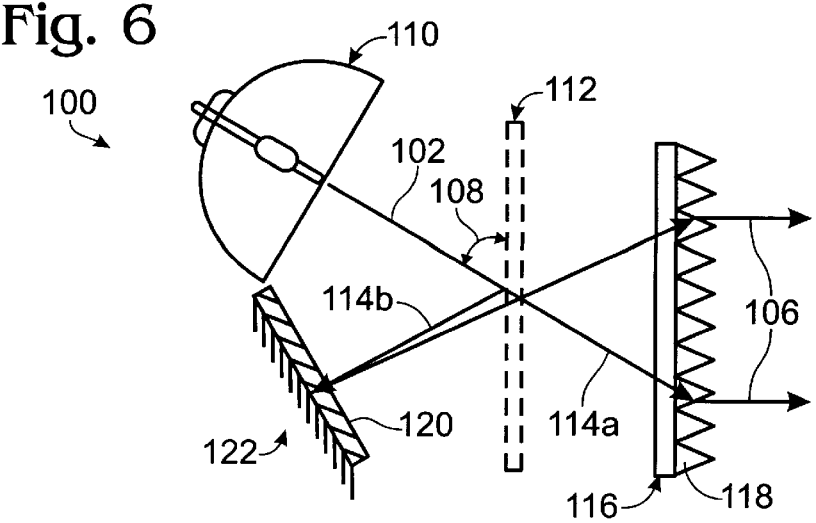
FIG. 6 is a diagrammatic side view of another embodiment of a high efficiency polarizing converter of the present invention.

FIG. 6 diagrammatic side view of another embodiment of a high efficiency polarizing converter 100 of the present invention that receives generally collimated light 102 of arbitrary polarization and converts it to light 106 of a selected polarization with minimal light losses. Polarizing converter 100 receives light 102 at an inclined angle of incidence 108 from a collimating light source 110, such as a high brightness arc lamp and a parabolic reflector.

A reflective polarizer 112 receives light 102 of arbitrary polarization, transmits light components 114a of a selected first polarization sense (e.g., S linearly polarized), and reflects light 114b of an opposite second polarization sense (e.g., P linearly polarized). Transmitted light 114a of the first polarization sense propagates through a half-wave plate retarder 116 and a planar combiner 118 that directs light 114a in an illumination direction. An optional half-wave plate retarder 116 changes the angle of the polarization direction. Combiner 118 may be analogous to combiner 62.

Light 114b of the second polarization sense (e.g., P linearly polarized) reflected by reflective polarizer 112 is directed toward a quarter-wave retarder 120 stacked with a flat reflector 122 (e.g., a front surface mirror) positioned across the path of the reflected light. Light 114b is circularly polarized by quarter-wave retarder 120, reflected by reflector 122, thereby changing circular polarization sense and directed back through quarter-wave retarder 120 to be converted to the first polarization sense. Now being of the first polarization sense, light 114b passes through reflective polarizer 112 and into combiner 118 to be directed with light 114a in the illumination direction.

Figure 7:
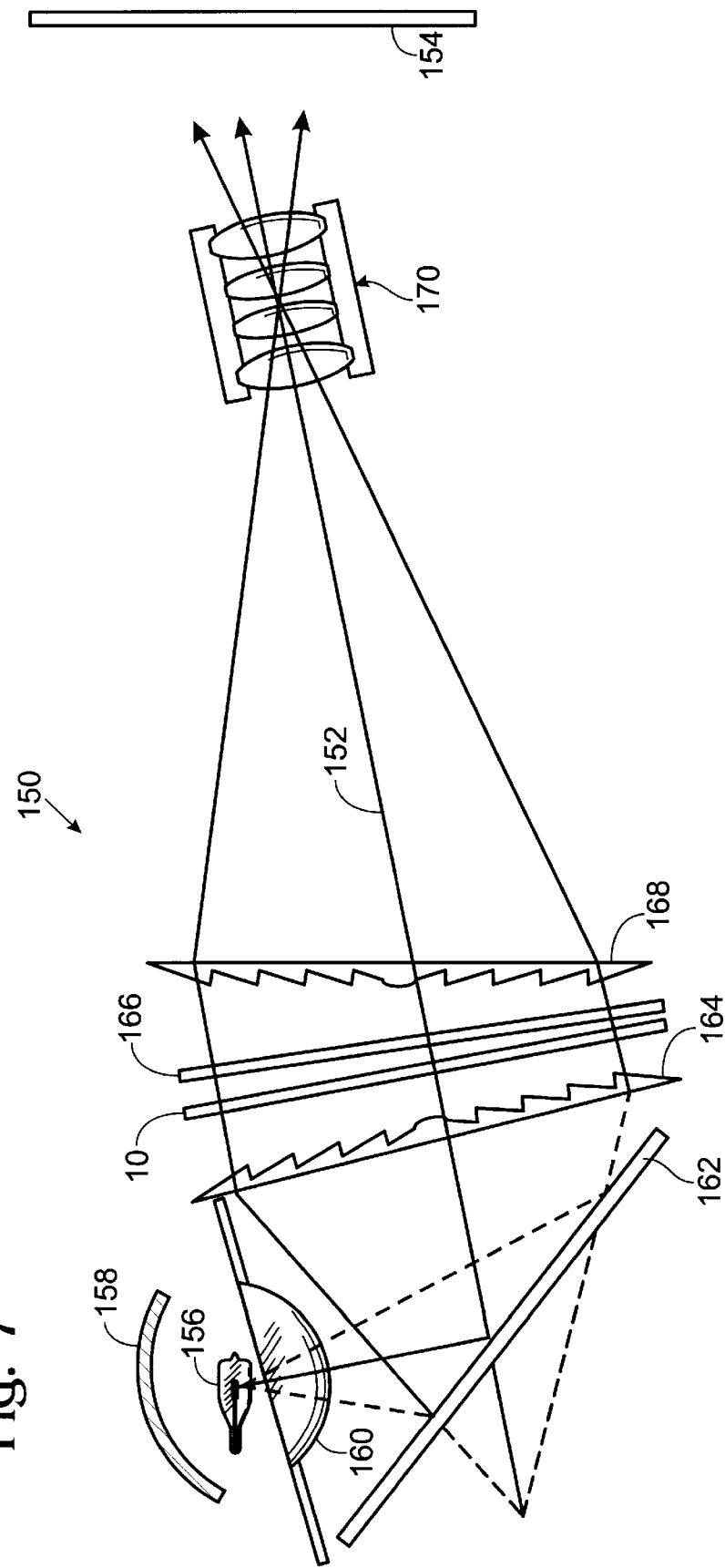
FIG. 7 is a schematic side view optical diagram of a LCD projector with a polarizing converter of the present invention.

FIG. 7 is a schematic side view optical diagram of a front LCD projector 150 that projects display images along a central optic axis 152 upward toward a reflective display screen 154. LCD projector 150 includes an illumination or light source 156 and a light-collecting reflector 158 that direct polychromatic, substantially white light through a spherical condenser lens 160. A display system configured as a front LCD projector is positioned with the viewers in front of reflective display screen 154.

A fold mirror 162 directs the light through a Fresnel collimating lens 164 that collimates the light and directs it through polarizing converter 10 to an image source 166 such as a transmissive color thin-film transistor (TFT) active matrix LCD. As is known in the art, image source 166 controls or modulates the substantially white light to form a multi- or full-color display object according to a video display signal delivered to image source 166 from display control circuitry (not shown). The light that passes through the display object propagates to a Fresnel converging lens 168 that focuses the light toward a conventional objective projection lens assembly 170 such as a varifocal lens assembly.

Polarizing converter 10 significantly reduces the loss or absorption of light that would occur in LCD projector 150 with a conventional film polarizer. In addition, the generally planar configuration of polarizing converter 10 is rugged, relatively inexpensive to manufacture, and requires minimal space within the housing of LCD projector 150. As a result, polarizing converter 10 provides LCD projector 150 with increased brightness output.

Having illustrated and described the principles of the present invention in a preferred embodiment, it should be apparent to those skilled in the art that the embodiment can be modified in arrangement and detail without departing from such principles. Accordingly, we claim as our invention all such embodiments as come within the scope and spirit of the following claims and equivalents thereto.

We claim:

1. A planar polarizing converter structure, comprising:
   a planar beam splitter that receives light at an incident light-receiving surface and compresses incident light into plural distinct regions separated by dark regions;
   a flat reflective polarizer that receives light compressed into the plural distinct regions, transmits light of a first polarization sense and reflects light of an opposite second polarization sense; and
   a planar array of reflectors that are generally parallel to the incident light-receiving surface and positioned in the dark regions to receive the reflected light of the second polarization sense and redirect the light through the reflective polarizer in the first polarization sense.

2. The polarizing converter structure of claim 1 further comprising a combiner with a planar array of light combining prismatic structures that receive light transmitted by the reflective polarizer.

3. The polarizing converter structure of claim 1 in which the reflectors are supported by frusto-prismatic structures.

4. The polarizing converter structure of claim 1 in which the beam splitter includes a planar array of light splitting prismatic structures that compress the incident light by total internal reflection.

5. The polarizing converter structure of claim 1 in which the reflectors in the planar array are supported on transmissive structures having pairs of sidewalls through both of which the flat reflective polarizer receives the light compressed into the plural distinct regions.

6. A planar polarizing converter structure, comprising:
   a planar array of light splitting prismatic structures that are positioned opposite and integral with an incident light-receiving surface, the array including inclined recesses positioned between adjacent pairs of the light splitting prismatic structures;
   a planar array of frusto-prismatic structures that extend into the inclined recesses positioned between adjacent pairs of the light splitting prismatic structures and include generally flat light exiting surface areas;
   a planar array of light combining prismatic structures positioned opposite and integral with an intermediate light receiving surface; and
   a flat reflective polarizer positioned between the light exiting surface areas of the planar array of frusto-prismatic structures and the light receiving surface of the planar array of light combining prismatic structures.

7. The polarizing converter structure of claim 6 in which the frusto-prismatic structures support reflective surfaces within the inclined recesses positioned between adjacent pairs of the light splitting prismatic structures.

8. The polarizing converter structure of claim 7 in which the reflective surfaces are generally parallel to and facing the light exiting surface areas.

9. The polarizing converter structure of claim 7 in which the frusto-prismatic structures include frustum surfaces that are generally parallel and opposed to the light exiting areas and only the frustum surfaces include the reflective surfaces.

10. The polarizing converter structure of claim 6 in which the planar array of light splitting prismatic structures and the planar array of light combining prismatic structures are formed of plastic.

11. The polarizing converter structure of claim 6 in which the light splitting prismatic structures totally internally reflect incident light propagating within the light splitting prismatic structures and normal to the incident receiving surface.

12. The polarizing converter structure of claim 6 in which the frusto-prismatic structures include transparent side faces and the light splitting prismatic structures converge light toward the transparent side faces of the frusto-prismatic structures.

13. The polarizing converter structure of claim 6 in which the light combining prismatic structures have prismatic faces that are oriented symmetrically.

14. The polarizing converter structure of claim 6 in which the light combining prismatic structures have prismatic faces that are oriented asymmetrically.

15. A polarizing converter structure, comprising:
   a generally flat reflective polarizer that is positioned to receive light from incident directions, transmits light of a first polarization sense, and reflects light of an opposed second polarization sense in reflection directions that are different from the incident directions;
   a reflector structure that has plural distinct reflector surfaces and is positioned along and transverse to the reflection directions with the reflector surfaces generally parallel to the reflective polarizer to reflect the light propagating in the reflection directions back toward the reflective polarizer and to reverse the polarization sense of the light, thereby directing to the reflective polarizer light of the first polarization sense, the reflector surfaces being supported on transmissive structures having pairs of sidewalls through both of which the flat reflective polarizer receives light from the incident directions; and a planar array of light combining prismatic structures receiving light of the first polarization sense from the reflective polarizer and directing the light in a common direction to form combined polarized light.

16. The polarization converter structure of claim 15 in which each of the reflector surfaces receives light from a different region of the reflective polarizer.

17. The polarization converter structure of claim 14 in which the reflective polarizer, the reflector structure, and the planar array of light combining prismatic structures are held in contact with one another.

18. The polarization converter structure of claim 14 further comprising a planar array of light splitting prismatic structures that receive incident light and direct it toward the reflective polarizer generally in the incident direction.

19. The polarization converter structure of claim 18 in which the reflective polarizer, the reflector structure, the planar array of light combining prismatic structures and the array of light splitting prismatic structures are held in contact with one another.

20. The polarizing converter structure of claim 14 in which the first and second polarization senses are opposed circular polarizations and the structure further includes a quarter-wave plate positioned between the reflective polarizer and the planar array of light combining prismatic structures.

21. In a liquid crystal display projector, the improvement comprising:

a planar polarizing converter structure that includes a planar array of light splitting prismatic structures that are positioned opposite and integral with an incident light-receiving surface, the array including inclined recesses positioned between adjacent pairs of the light splitting prismatic structures, and a planar array of frusto-prismatic structures that extend into the inclined recesses positioned between adjacent pairs of the light splitting prismatic structures and include generally flat light exiting surface areas.

22. The projector of claim 21 in which the polarizing converter further comprises a planar array of light combining prismatic structures positioned opposite and integral with an intermediate light receiving surface and a flat reflective polarizer positioned between the light exiting surface areas of the planar array of frusto-prismatic structures and the light receiving surface of the planar array of light combining prismatic structures.

* * * * *